United States Patent
Flores Mariles et al.

(10) Patent No.: US 11,332,062 B2
(45) Date of Patent: May 17, 2022

(54) VEHICLE STRUCTURE

(71) Applicant: Nissan North America, Inc., Franklin, TN (US)

(72) Inventors: Jorge Alberto Flores Mariles, Lerma (MX); Carlos Ivan Cano Lopez, San Antonio la Isla (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 223 days.

(21) Appl. No.: 16/654,344

(22) Filed: Oct. 16, 2019

(65) Prior Publication Data

US 2021/0114508 A1 Apr. 22, 2021

(51) Int. Cl.
*B60P 7/08* (2006.01)
*B62D 25/04* (2006.01)

(52) U.S. Cl.
CPC ............ *B60P 7/0807* (2013.01); *B62D 25/04* (2013.01)

(58) Field of Classification Search
CPC .. B60P 7/0807; B60P 7/02; B60P 7/04; B60P 7/0876
USPC ................ 410/102, 105, 106, 107, 109, 111; 296/191
See application file for complete search history.

(56) References Cited

U.S. PATENT DOCUMENTS

| | | | |
|---|---|---|---|
| 2,756,693 A * | 7/1956 | Frost | B60P 7/0807 410/116 |
| 4,630,982 A | 12/1986 | Fenner | |
| 5,769,294 A * | 6/1998 | Heinz | B60R 7/02 224/567 |
| 6,908,269 B1 * | 6/2005 | Youngs | B60P 7/0807 410/100 |
| 7,819,451 B2 * | 10/2010 | Yoshida | B60R 5/047 296/24.4 |
| 8,794,886 B1 | 8/2014 | Nett et al. | |
| 9,592,767 B2 | 3/2017 | Stakoe et al. | |

FOREIGN PATENT DOCUMENTS

EP 0224280 B1 7/1989

* cited by examiner

*Primary Examiner* — D Glenn Dayoan
*Assistant Examiner* — Sunsurraye Westbrook
(74) *Attorney, Agent, or Firm* — Global IP Counselors, LLP

(57) ABSTRACT

A vehicle structure includes a vehicle body structure, a first tie-down assembly and a second tie-down assembly. The vehicle body structure defines a cargo area having a floor structure, a first pillar structure and a second pillar structure. The first and second pillar strictures are spaced apart from one another and are rigid strictures that extend upward from the floor structure. The first tie-down assembly is attached to the first pillar structure. The second tie-down assembly is attached to the second pillar structure.

20 Claims, 9 Drawing Sheets

VEHICLE STRUCTURE

BACKGROUND

Field of the Invention

The present invention generally relates to a vehicle structure that includes tie-down assemblies within a cargo area of a vehicle. More specifically, the present invention relates to a vehicle structure having tie-down assemblies fixed to upright side walls of a vehicle cargo area where the tie-down assemblies are at differing heights above a floor structure of the vehicle.

Background Information

Vehicle cargo areas typically include an array cleat or other attachment structures along a floor of a cargo area.

SUMMARY

One object of the present disclosure is to provide a cargo area with a plurality of tie-down assemblies installed to a side wall of the cargo area, with the plurality of tie-down assemblies being located at differing heights above a floor structure of the cargo area.

In view of the state of the known technology, one aspect of the present disclosure is to provide a vehicle structure a vehicle body structure, a first tie-down assembly and a second tie-down assembly. The vehicle body structure defines a cargo area having a floor structure, a first pillar structure and a second pillar structure. The first and second pillar structures are spaced apart from one another and are rigid structures that extend upward from the floor structure. The first tie-down assembly is attached to the first pillar structure. The second tie-down assembly attached to the second pillar structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
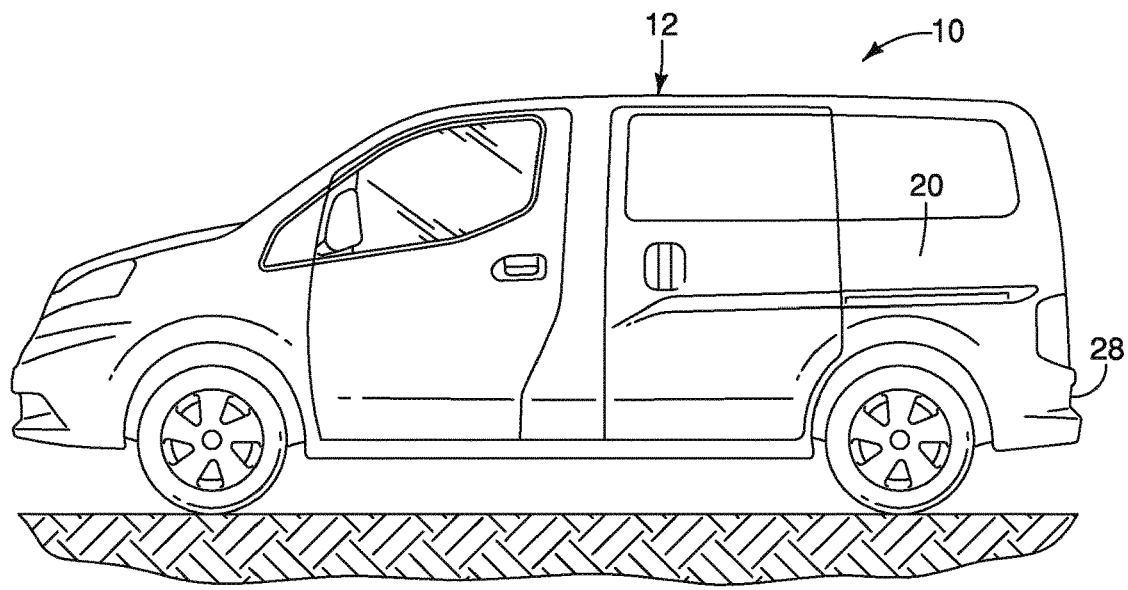
FIG. 1 is a side view of a vehicle that includes a cargo area in accordance with one embodiment.
Figure 2:
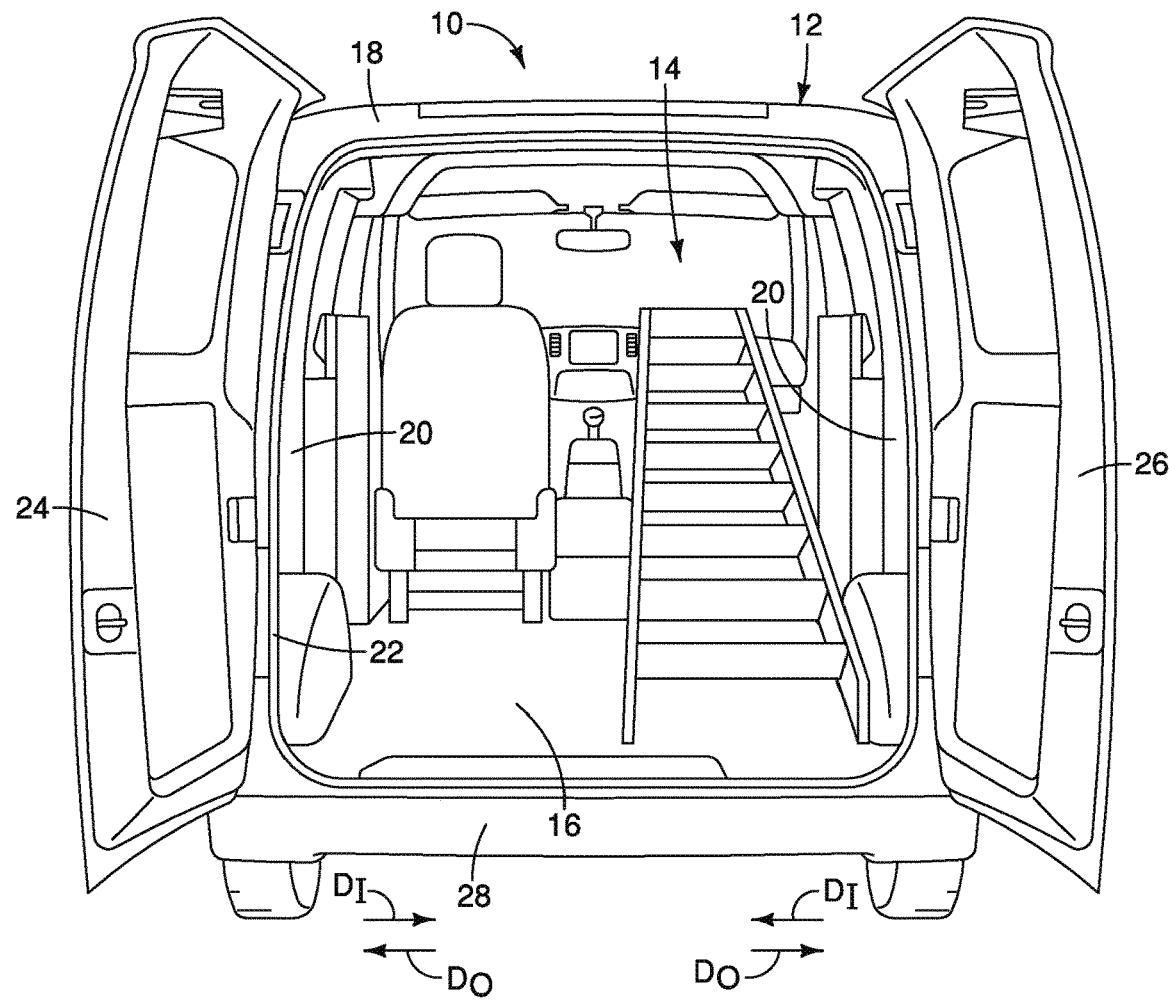
FIG. 2 is a rear view of the vehicle with cargo doors in an open orientation exposing the cargo area and showing a floor structure and side wall structures in accordance with the one embodiment.

Referring initially to FIGS. 1 and 2, a vehicle 10 having a vehicle body structure 12 that defines a cargo area 14 is illustrated in accordance with a first embodiment.

Figure 3:
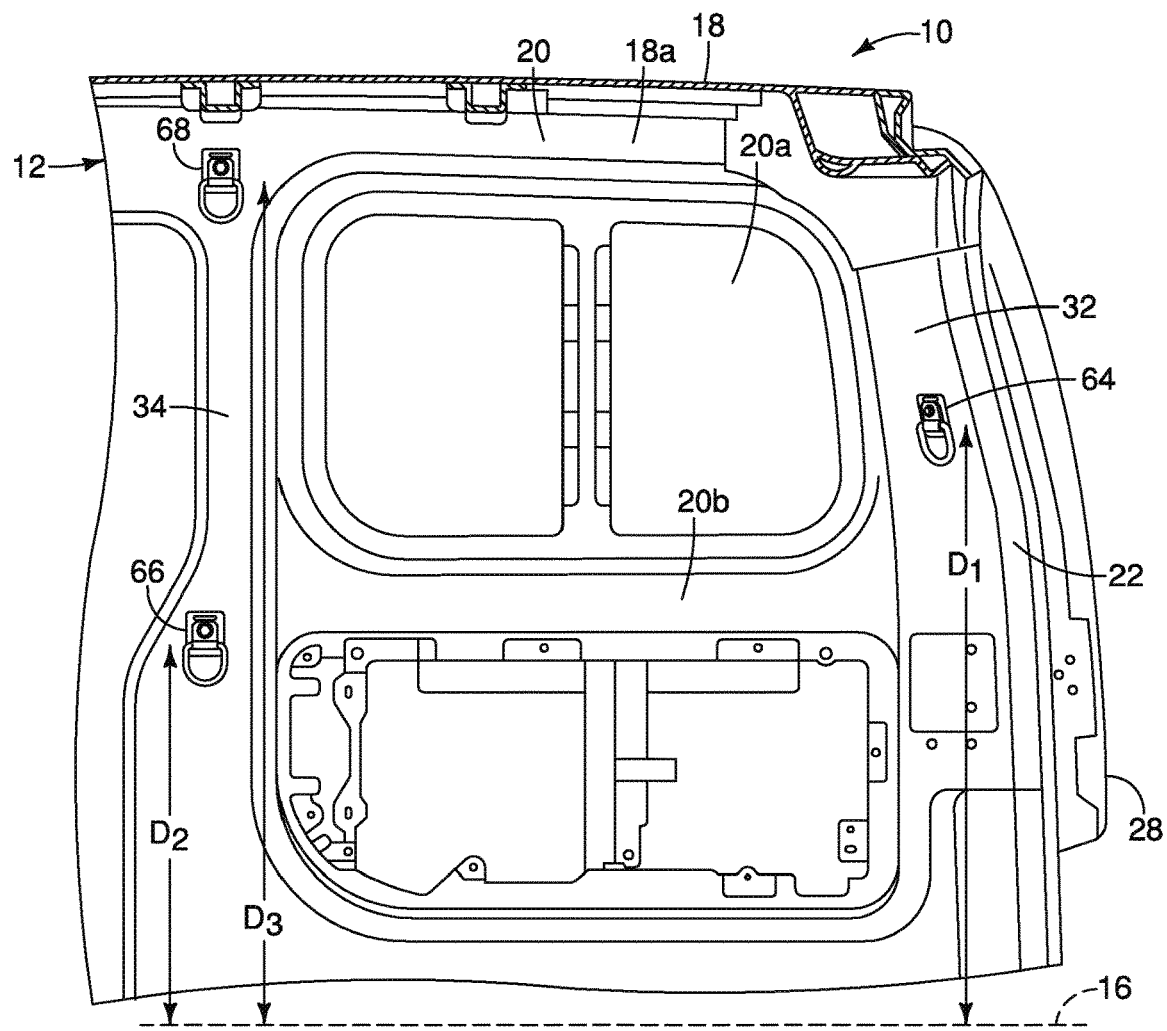
FIG. 3 is a view of an interior surface of an inner panel of one of the side wall structures showing first, second and third tie-down assemblies fixedly attached to the side wall structures in accordance with the one embodiment.

As shown in FIGS. 2 and 3, the vehicle body structure 12 includes a floor structure 16, a roof structure 18, side wall structures 20, a door opening 22 and doors 24 and 26 located at a rear end 28 of the vehicle body structure 12. The door opening 22 is defined at a rear end 28 of the vehicle 10, above the floor structure 16, below the roof structure 18 and between the side wall structures 20. The doors 24 and 26 pivot between closed orientations (FIG. 2) and open orientations (FIG. 3) in a conventional manner.

In FIG. 2, relative directions are shown, including inboard directions $D_I$ and outboard directions $D_O$. The inboard directions $D_I$ are directions from lateral sides of the vehicle 10 extending toward a center of the vehicle 10. Similarly, outboard directions $D_O$ are directions extending from the center of the vehicle 10 toward outboard areas of the vehicle 10. In the description below, the terms inner and outer are used to characterize various elements relative to the inboard directions $D_I$ and the outboard directions $D_O$. Specifically, those elements that are inner elements are closer to the center of the vehicle 10 than outer elements of the vehicle 10. Similarly, outer elements are further from the center of the vehicle 10 that inner elements.

In the description below, some elements and structures are characterized as being upright or extending in an upright direction. Such elements extend in approximately a vertical direction but includes directions that are up to 20 degrees inclined relative to vertical.

The cargo area 14 is defined above the floor structure 16, between the wall structures 20 and below the roof structure 18. When the doors 24 and 26 are open, the cargo area 14 is exposed and can be accessed, as shown in FIG. 2.

Within the cargo area 14, each of the side wall structures 20 is exposed. The side wall structures 20 are basically identical except that they are symmetrical mirror images of one another. Therefore, description of one of the side wall structures 20 applies equally to the other side wall structure 20. In the description below, only one of the wall structures 20 is described for the sake of brevity.

Figure 5:
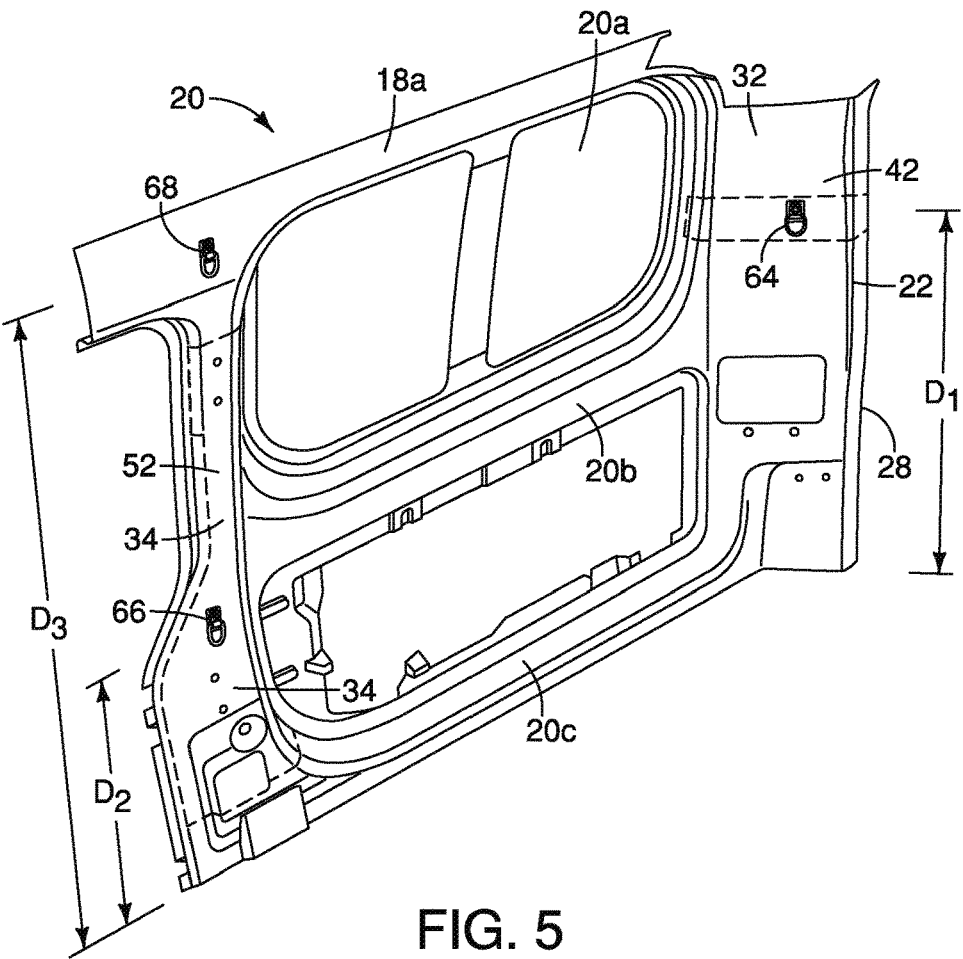
FIG. 5 is a perspective view of a portion of the side wall structure showing a rearmost pillar structure (a D-pillar) referred to herein below as a first pillar structure and a mid-vehicle pillar structure (a C-pillar) referred to herein below as a second pillar structure in accordance with the one embodiment.
Figure 6:
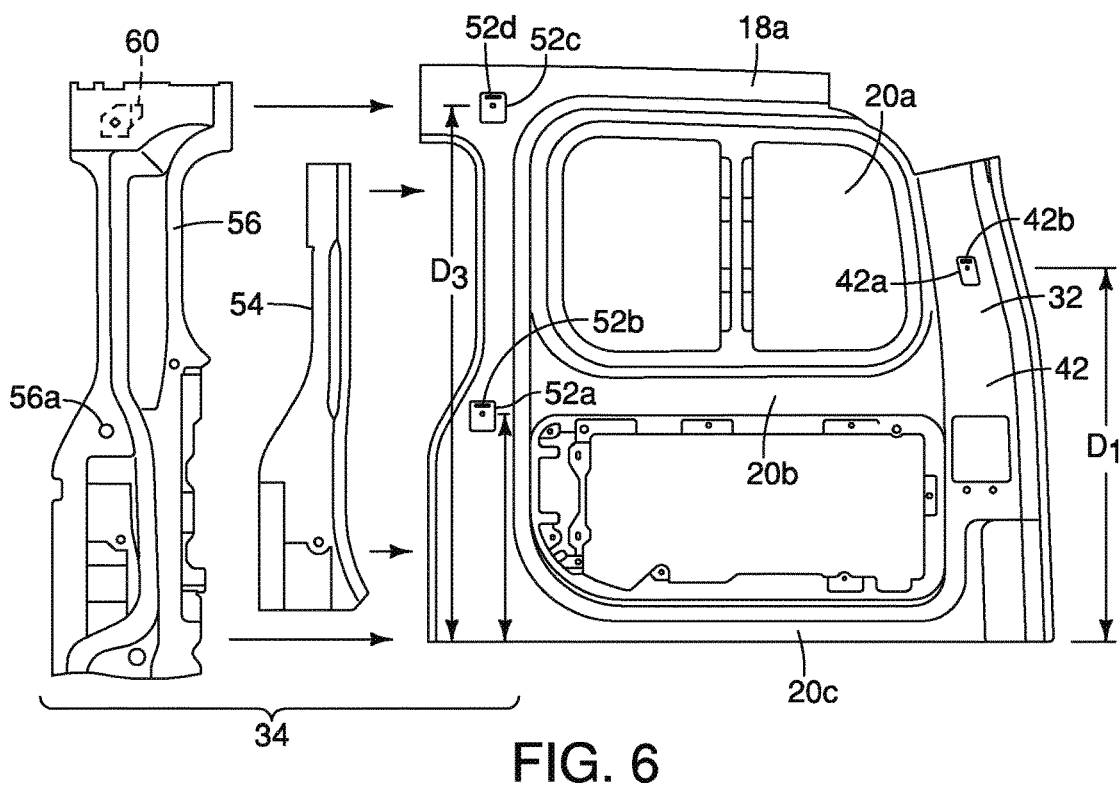
FIG. 6 is an exploded view of the side wall structure showing an inner panel, a reinforcement panel and an outer pillar panel of the second pillar structure in accordance with the one embodiment.

As shown in FIGS. 3, 5 and 6, the side wall structure 20 includes, among other features and components, a first pillar structure 32 and a second pillar structure 34. The first pillar structure 32 is a rear-most pillar of the vehicle body structure 12, also referred to as a D-pillar. The second pillar structure 34 is forward of and spaced apart from the first pillar structure 32. The second pillar structure 34 is also referred to as a C-pillar. However, it should be understood from the drawings and the description herein, that for other vehicle designs, the first pillar structure 32 could alternatively be a C-pillar and be a rearward-most pillar, and the second pillar structure 34 could be a B-pillar forward of the first pillar structure 32. The first pillar structure 32 and the second pillar structure 34 are rigid structures that extend upward from the floor structure 16 to the roof structure 18.

As is shown in cross-section in FIGS. 8-10 (and described further below), the first pillar structure 32 includes an inner panel 42, a reinforcement panel 44, an outer pillar panel 46 and an outer panel 48, as described further below.

As shown in FIGS. 6, 12-13, 15, and 18-19, the second pillar structure 34 includes a second inner panel 52, a second reinforcement panel 54, an outer pillar panel 56, an outer panel 58 and a supplemental reinforcement panel 60 (FIGS. 15-19).

It should be understood from the drawings and the description herein that the inner panel 42 and the second inner panel 52 can be formed as a single panel along with roof rail portion 18a and wall panel portions 20a, 20b and 20c that extend therebetween, as shown in FIGS. 3 and 5. Alternatively, the inner panel 42 and the second inner panel 52 can be separate panels that are welded or otherwise fixedly attached to the roof rail portion 18a and wall panel portions 20a, 20b and 20c.

As shown in FIG. 3, the side wall structure 20 further includes a first tie-down assembly 64 attached to the first pillar structure 32, a second tie-down assembly 66 attached to the second pillar structure 34 and a third tie-down assembly 68 also attached to the second pillar structure 34 at a location above the second tie-down assembly 66.

Further as shown in FIGS. 3, 5 and 6, the first tie-down assembly 64 is a first distance $D_1$ above the floor structure 16, the second tie-down assembly 66 is a second distance $D_2$ above the floor structure 16 and the third tie-down assembly 68 is a third distance $D_3$ above the floor structure 16. The first distance $D_1$ is greater than the distance $D_2$. The distance $D_3$ is greater than the first and second distances $D_1$ and $D_2$. In other words, the third tie-down assembly 68 is higher above the floor structure 16 than both the first and second tie-down assemblies 64 and 66. Further, the first tie-down assembly 64 is higher above the floor structure 16 than the second tie-down assembly 66, and closer to the floor structure 16 than the third tie-down assembly 66. The differing heights above the floor structure 16 provides greater flexibility when the first, second and third tie-down assemblies 64, 66 and 68 are used to secure cargo within the cargo area 14.

Each of the first tie-down assembly 64, the second tie-down assembly 66 and the third tie-down assembly 68 includes a bracket 72 and a D-ring 74. In other words, each of the first tie-down assembly 64, the second tie-down assembly 66 and the third tie-down assembly 68 include identical elements but are installed at differing locations along the side wall structure 20. In the depicted embodiment, the first tie-down assembly 64 is fixed to the first pillar structure 32 via a first fastener portion $F_1$ that can be, for example, a mechanical fastener with a threaded portion that is threaded into a second fastener portion $N_1$, that is described further below. The second tie-down assembly 66 is fixed to the second pillar structure 34 via a first fastener portion $F_2$ that can be a mechanical fastener with a threaded portion that is threaded into a second fastener portion $N_2$, also described further below. Similarly, the third tie-down assembly 68 is fixed to the second pillar structure 34 above the second tie-down assembly 66 via a first fastener portion $F_3$ that can be a mechanical fastener with a threaded portion that is threaded in a second fastener portion $N_2$, that is described further below.

In the depicted embodiments, as shown in FIGS. 4, 8, 12 and 18, the bracket 72 is a single piece of, for example, sheet metal that is bent and shaped to define an attachment section 72a with an opening 72b and a ring retaining section 72c. The attachment section 72a is defined by two layers of the sheet metal that have been bent to overlay one another, with the bent portion of the sheet metal defining the ring retaining section 72c. The opening 72b is dimensioned to receive one of the first fastener portions $F_1$, $F_2$ or $F_3$. The ring retaining section 72c has a cross-sectional shape that defines a rounded opening that receives the D-ring 74 such that the D-ring 74 can pivot within the ring retaining section 72c.

Figure 4:
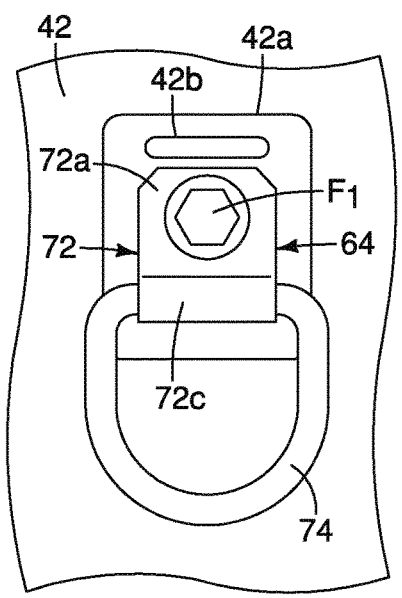
FIG. 4 is a view of the first tie-down assembly in accordance with the one embodiment.

The bracket 72 can be any of a variety of shapes so long as it can be fixed to the side wall structure 20 via one of the first fastener portions $F_1$, $F_2$ or $F_3$, and has the ring retaining section 72c that supports the D-ring 74. In the depicted embodiment, the bracket 72 has an overall rectangular shape, as shown in FIG. 4. The D-ring 74 is basically a round ring that includes a straight portion that is installed within the ring retaining section 72c such that the D-ring 74 pivots about the straight portion within to the ring retaining section 72c.

Figure 8:
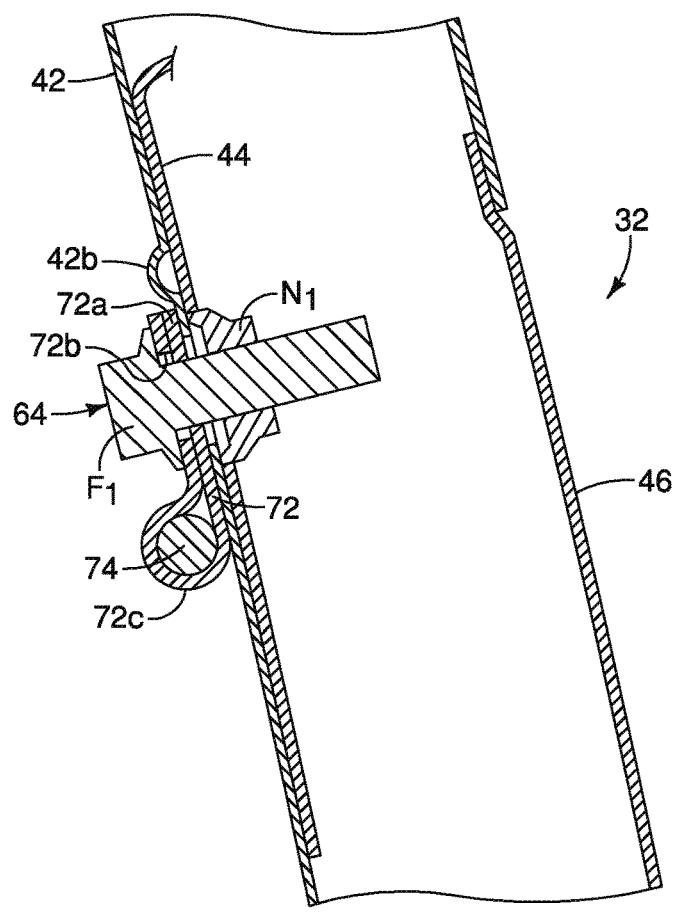
FIG. 8 is a cross-sectional view of the first pillar structure taken along the lines 8-8 in FIG. 7, showing the first tie-down assembly fixed to an inner panel and a reinforcement panel of the first pillar structure in accordance with the one embodiment.
Figure 9:
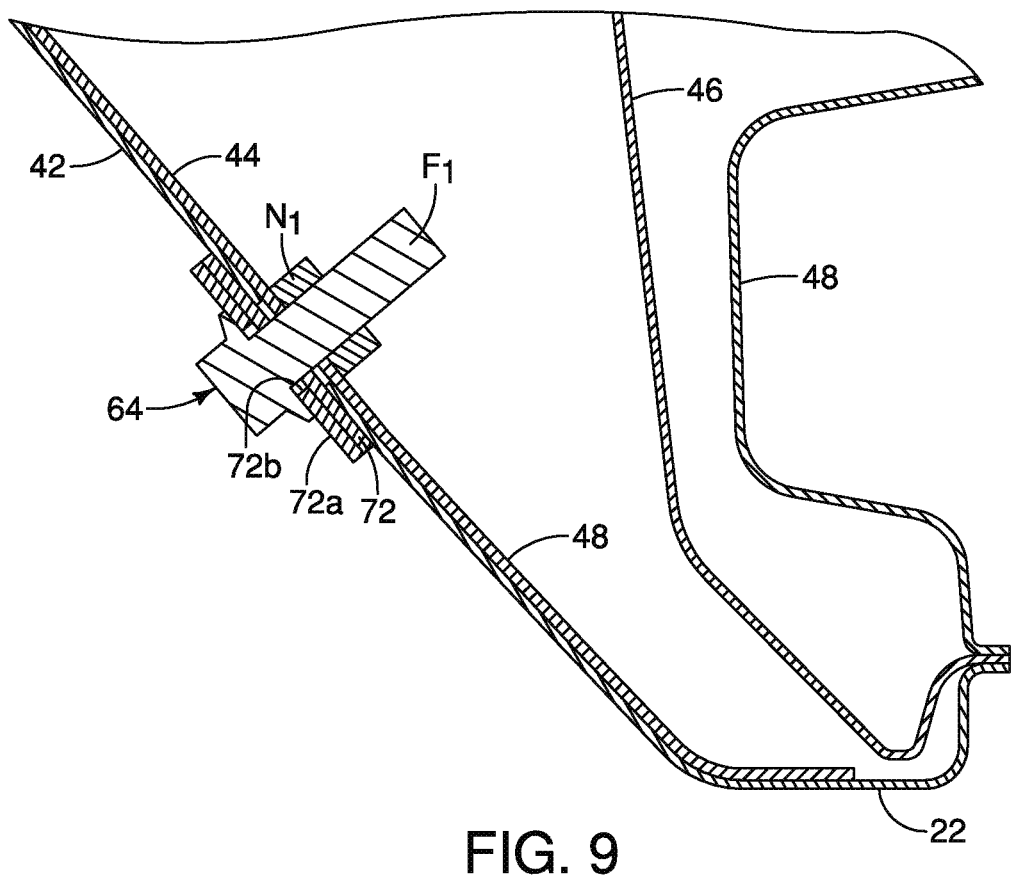
FIG. 9 is another cross-sectional view of the first pillar structure taken along the lines 9-9 in FIG. 7, showing the first tie-down assembly fixed to the inner panel and the reinforcement panel of the first pillar structure in accordance with the one embodiment.

The first tie-down assembly 64 is fixedly attached to the first pillar structure 32, as shown in FIGS. 3-5, 8 and 9. Specifically as shown in FIGS. 8 and 9, the first fastener portion $F_1$ is inserted into and through the opening 72b of the attachment section 72a of the bracket 72, through a corresponding opening in the inner panel 42 and into the reinforcement panel 44 such that the first fastener portion $F_1$ threads into and through the second fastener portion $N_1$ (also referred to as a nut $N_1$). The second fastener portion $N_1$ is welded or otherwise rigidly attached to the reinforcement panel 44.

During installation of the first tie-down assembly 64, the bracket 72 is approximately centered within a depression or embossment 42a, with an upper edge of the bracket 72 being positioned below and aligning with an alignment embossment 42b. From within the cargo area 14, the embossment 42a appears as a slight depression or concaved area of the inner panel 42. The alignment embossment 42b appears as a linear convex or projection area.

Figure 7:
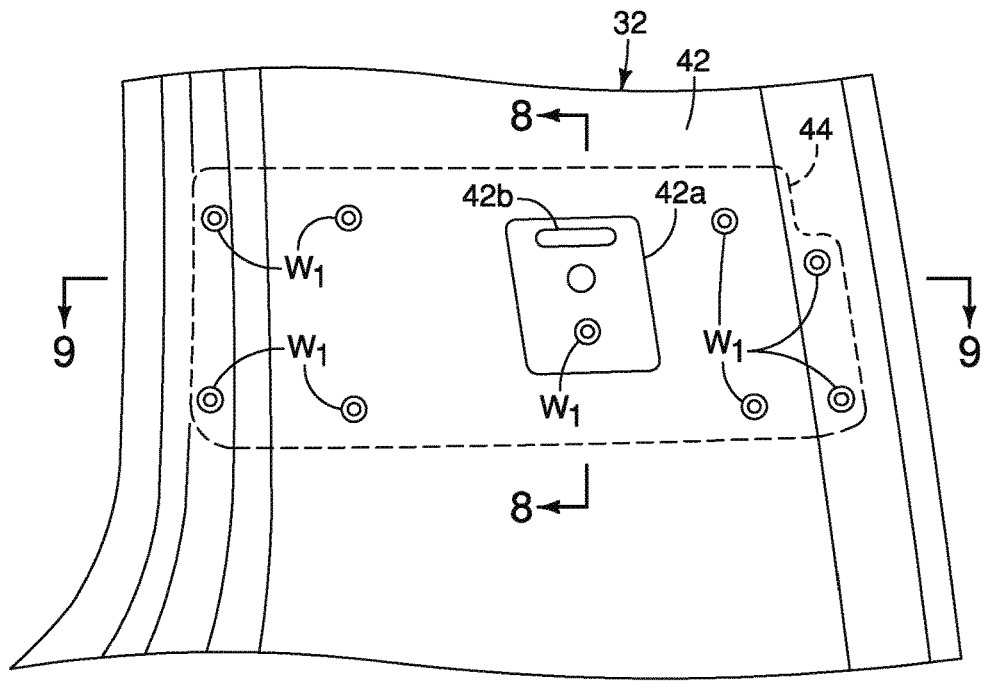
FIG. 7 is a plan view of a portion of the first pillar structure showing the first tie-down structure fixedly attached thereto in accordance with the one embodiment.

As shown in FIG. 7, the reinforcement panel 44 is welded to the inner panel 42 at weld locations $W_1$. The reinforcement panel 44 has an overall contoured shape, as shown in FIGS. 7 and 9. Specifically, the lateral ends of the reinforcement panel 44 are curved to conform to the overall shape of the inner panel 42.

Figure 10:
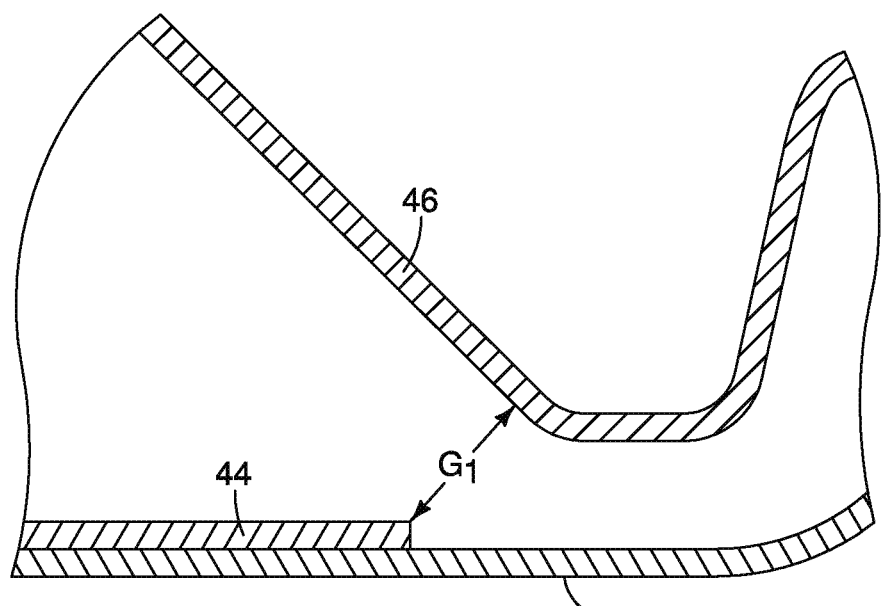
FIG. 10 is a cross-sectional view showing a section of the first pillar structure depicted in FIG. 9, showing a gap defined between the reinforcement panel and an outer pillar panel of the first pillar structure in accordance with the one embodiment.

As shown in FIGS. 9 and 10, the reinforcement panel 44 has an inboard end that is spaced apart from an adjacent portion of the outer pillar panel 46, defining a gap $G_1$ therebetween (FIG. 10). The gap $G_1$ ensures that the reinforcement panel 44 and the outer pillar panel 46 have a non-contacting relationship, thereby eliminating possible rattling noises.

Figure 11:
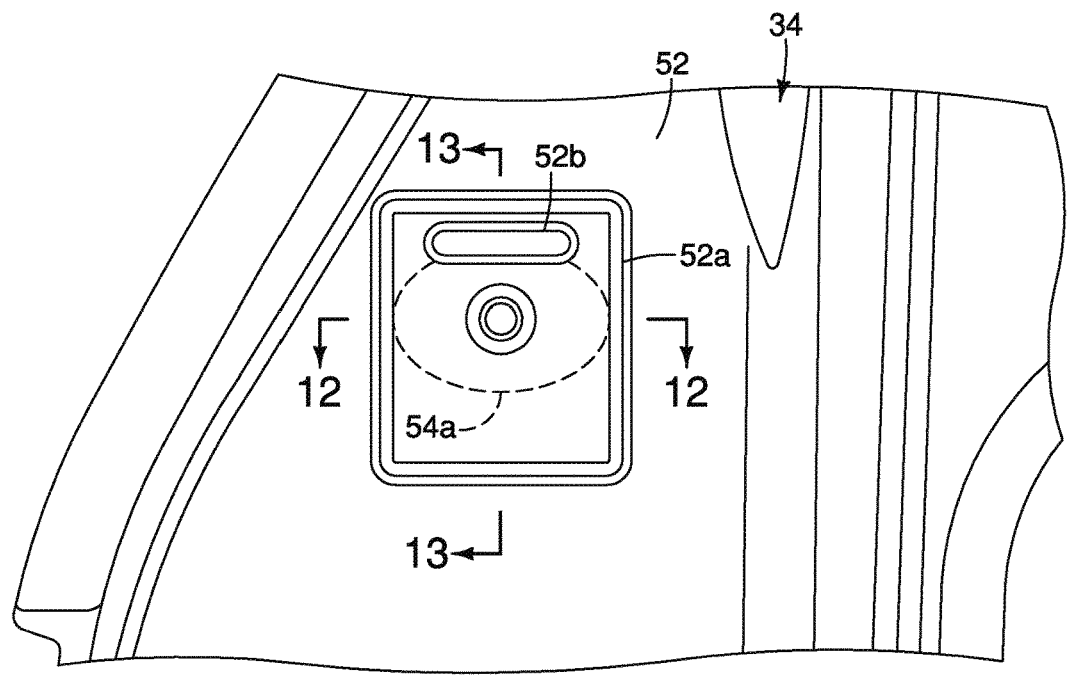
FIG. 11 is a plan view of a lower portion of the second pillar structure showing the second tie-down structure fixedly attached thereto in accordance with the one embodiment.
Figure 12:
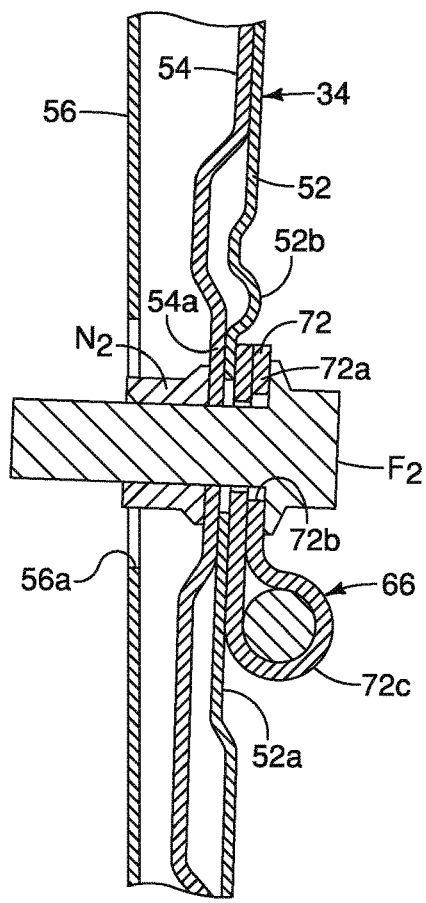
FIG. 12 is a cross-sectional view of the lower portion of the second pillar structure taken along the lines 12-12 in FIG. 11, showing the second tie-down assembly fixed to an inner panel and a reinforcement panel of the second pillar structure in accordance with the one embodiment.
Figure 13:
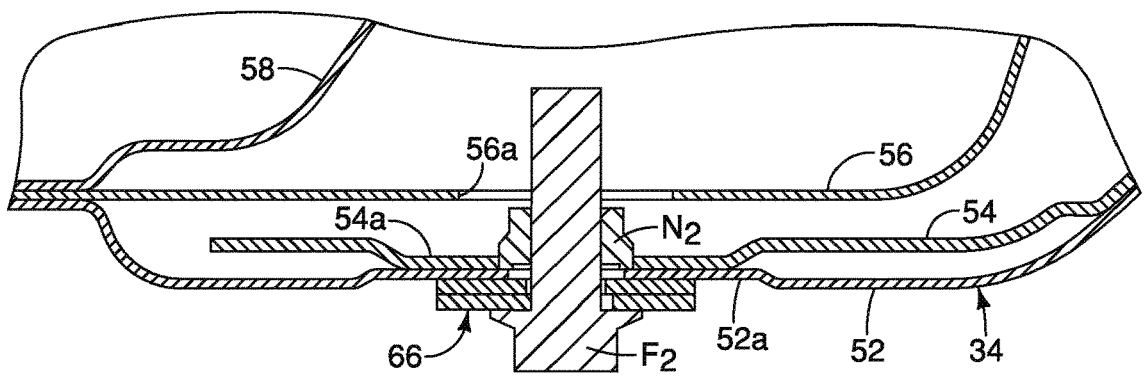
FIG. 13 is another cross-sectional view of the first pillar structure taken along the lines 13-13 in FIG. 11, showing the second tie-down assembly fixed to the inner panel and the reinforcement panel of the second pillar structure in accordance with the one embodiment.
Figure 14:
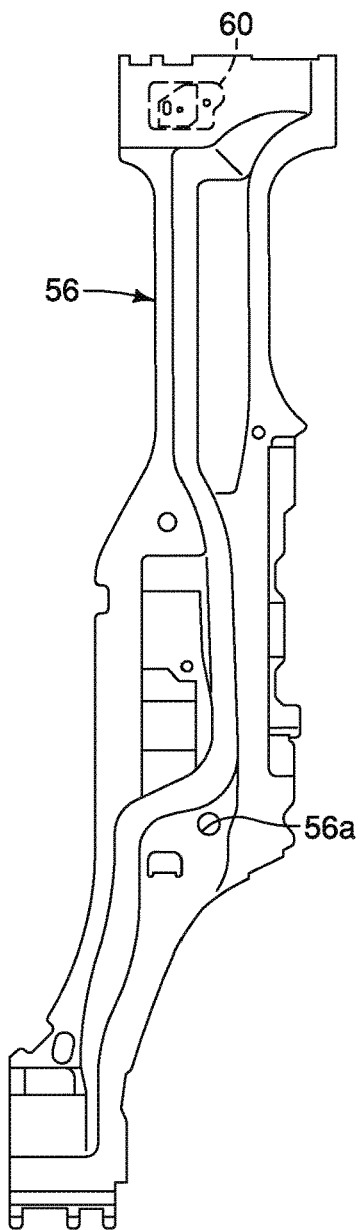
FIG. 14 is a plan view of the outer pillar panel of the second pillar structure shown removed from the side wall structure shown an opening along the lower portion of the second pillar portion, and, an embossed area and a supplemental reinforcement panel at an upper portion of the second pillar structure in accordance with the one embodiment.

The second tie-down assembly 66 is fixedly attached to the second pillar structure 34, as shown in FIGS. 3-5 and 11-13. Specifically as shown in FIGS. 11 and 12, the first fastener portion $F_2$ is inserted into and through the opening 72b of the attachment section 72a of the bracket 72, through a corresponding opening in the inner panel 52 and into the reinforcement panel 54 such that the first fastener portion $F_2$ threads into and through the second fastener portion $N_2$ (also referred to as a nut $N_2$). The second fastener portion $N_2$ is welded or otherwise rigidly attached to the reinforcement panel 54. The first fastener portion $F_2$ of the second tie-down assembly 66 can further extend through the opening 56a in the outer pillar panel 56. The opening 56a is oversized relative to the first fastener portion $F_2$ of the second tie-down assembly 66 in order to prevent contact (and noise) therebetween.

During installation of the second tie-down assembly 66, the bracket 72 is approximately centered within a depression or embossment 52a, with an upper edge of the bracket 72 being positioned below and aligning with an alignment embossment 52b. From within the cargo area 14, the embossment 52a appears as a slight depression or concaved area of the inner panel 52. The alignment embossment 52b appears as a linear convex or projection area.

The reinforcement panel 54 is provided with an oval shaped dimple or embossment 54a, with the nut $N_2$ welded to a surface of the reinforcement panel 54 within the embossment 54a. The reinforcement panel 54 is welded to the inner panel 52 at a plurality of weld location (not shown).

Figure 16:
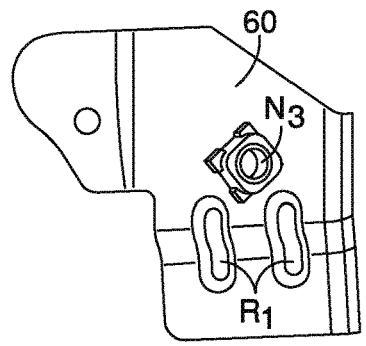
FIG. 16 is a perspective view of the supplemental reinforcement panel removed from the side wall structure showing a fastener or nut welded to the supplemental reinforcement panel in accordance with the one embodiment.
Figure 17:
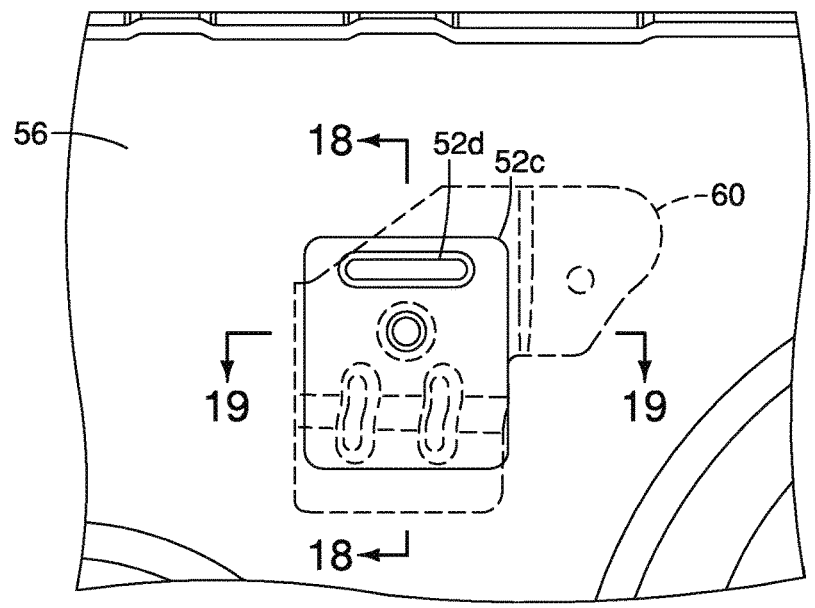
FIG. 17 is a plan view of the upper area of the second pillar structure showing an embossed area of the inner panel with the supplemental reinforcement panel in phantom in accordance with the one embodiment.
Figure 18:
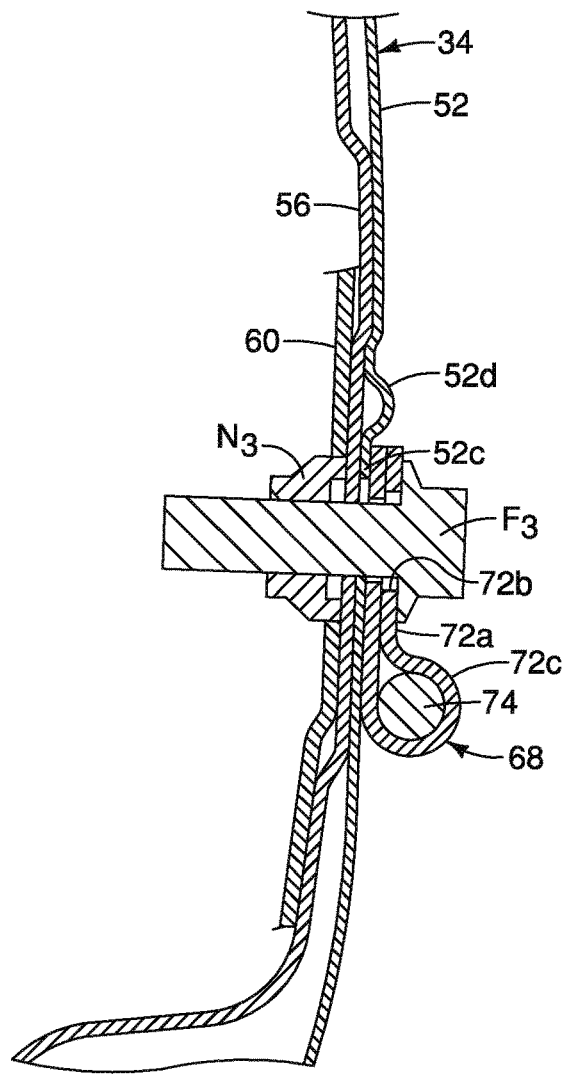
FIG. 18 is a cross-sectional view of the lower portion of the second pillar structure taken along the lines 18-18 in FIG. 17, showing the second tie-down assembly fixed to an inner panel and a reinforcement panel of the second pillar structure in accordance with the one embodiment.
Figure 19:
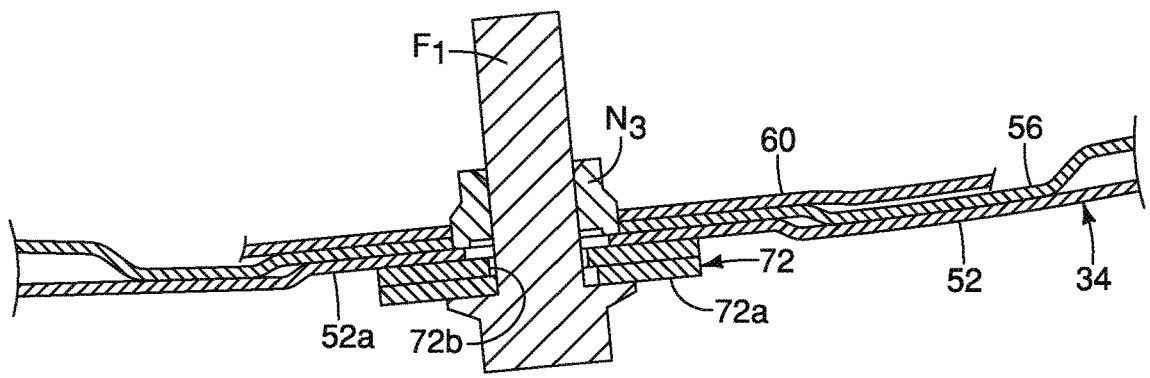
FIG. 19 is another cross-sectional view of the second pillar structure taken along the lines 19-19 in FIG. 17, showing the second tie-down assembly fixed to the inner panel and the reinforcement panel of the second pillar structure in accordance with the one embodiment.

The third tie-down assembly 68 is fixedly attached to the second pillar structure 34 above the second tie-down assembly 68, as shown in FIGS. 3-5 and 15-19. Specifically as shown in FIGS. 18 and 19, the first fastener portion $F_3$ is inserted into and through the opening 72b of the attachment section 72a of the bracket 72, through a corresponding opening in the outer pillar panel 56 and into the supplemental reinforcement panel 60 such that the first fastener portion $F_3$ threads into and through the second fastener portion $N_3$ (also referred to as a nut $N_3$). The second fastener portion $N_3$ is welded or otherwise rigidly attached to the supplemental reinforcement panel 60.

During installation of the third tie-down assembly 66, the bracket 72 is approximately centered within a depression or embossment 52c, with an upper edge of the bracket 72 being positioned below and aligning with an alignment embossment 52d. From within the cargo area 14, the embossment 52c appears as a slight depression or concaved area of the inner panel 52. The alignment embossment 52d appears as a linear convex or projection area.

Figure 15:
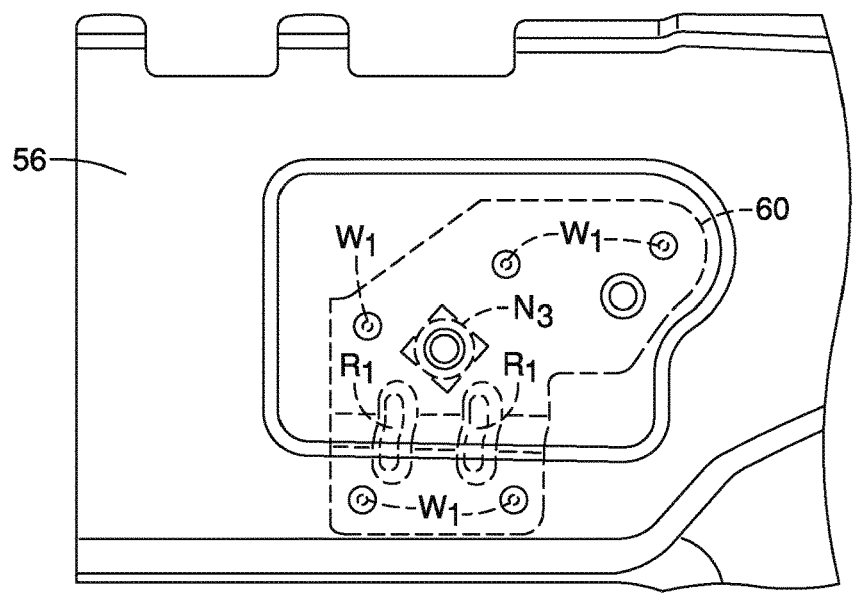
FIG. 15 is a plan view of the upper portion of the second pillar structure showing an embossed area of the outer pillar panel and the supplemental reinforcement panel fixedly attached thereto in accordance with the one embodiment.

The supplemental reinforcement panel 60 is welded to the outer pillar panel 60 at a plurality of weld location $W_1$, as shown in FIG. 15. As shown in FIG. 16, the supplemental reinforcement panel 60 has an inverted. L-shape and includes various contoured portions. One of the contoured portions at a lower portion of the supplemental reinforcement panel 60 is shaped to conform to the lower area of an embossment formed on the outer pillar panel 56. FIG. 17 shows the outer pillar panel 56 with the second inner panel 52 embossments 52c and 52d overlaying the outer pillar panel 56 and the supplemental reinforcement panel 60.

The staggered relationship, spacing and height differences between the locations of the first, second and third tie-down assemblies 64, 66 and 68, allows for flexible tie-down capability. Cargo of differing sizes and shapes can be tied down and secured in place. It should be understood from the drawings and the description herein that additional tie-down assemblies can be mounted to the floor structure 16 to complement add to the flexible tie-down capabilities of the first, second and third tie-down assemblies 64, 66 and 68.

The various vehicle structures and features of the vehicle 10 other than the first, second and third tie-down assemblies 64, 66 and 68 and the structures associated with the first, second and third tie-down assemblies 64, 66 and 68, are conventional components that are well known in the art. Since such vehicle structures and features are well known in the art, these structures will not be discussed or illustrated in detail herein. Rather, it will be apparent to those skilled in the art from this disclosure that the components can be any type of structure that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle structure. Accordingly, these terms, as utilized to describe the present invention should be interpreted relative to a vehicle equipped with the vehicle structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle structure, comprising
a vehicle body structure defining a cargo area having a floor structure, a first pillar structure and a second pillar structure, the first pillar structure having a first inner panel and a first reinforcement panel, the first and second pillar structures being spaced apart from one another, being rigid structures and extending upward from the floor structure;
a first tie-down assembly being fixedly attached to both the first inner panel and the first reinforcement panel of the first pillar structure; and
a second tie-down assembly attached to the second pillar structure.

2. The vehicle structure according to claim 1, wherein the first tie-down assembly is a first distance above the floor structure, and
the second tie-down assembly is a second distance above the floor structure, the first distance being greater than the second distance.

3. The vehicle structure according to claim 2, further comprising
a third tie-down assembly attached to the second pillar structure at a location above the second tie-down assembly.

4. The vehicle structure according to claim 3, wherein the third tie-down assembly is a third distance above the floor structure, the third distance is greater than the first distance and the second distance.

5. The vehicle structure according to claim 1, wherein the first pillar structure defines a rearward-most pillar of the vehicle body structure.

6. The vehicle structure according to claim 5, wherein the second pillar structure is located forward of the first pillar structure.

7. The vehicle structure according to claim 1, wherein the first tie-down assembly includes a first fastener portion, a bracket and a D-ring, the D-ring being supported to the bracket for pivotal movement with respect to the bracket, the first fastener portion extending through an opening in the bracket and through a second fastener portion rigidly fixed to the first reinforcement panel.

8. The vehicle structure according to claim 1, wherein the second pillar structure has a second inner panel and a second reinforcement panel, the second tie-down assembly being fixedly attached to both the second inner panel and the second reinforcement panel.

9. The vehicle structure according to claim 8, wherein the second tie-down assembly includes a first fastener portion, a bracket and a D-ring, the D-ring being supported to the bracket for pivotal movement with respect to the bracket, the first fastener portion extending through an opening in the bracket and through a second fastener portion rigidly fixed to the second reinforcement panel.

10. A vehicle structure, comprising
a vehicle body structure defining a cargo area having a floor structure, a first pillar structure and a second pillar structure, the first and second pillar structures being spaced apart from one another, being rigid structures and extending upward from the floor structure;
a first tie-down assembly attached to the first pillar structure a first distance above the floor structure; and
a second tie-down assembly attached to the second pillar structure at a second distance above the floor structure, the first distance being greater than the second distance, and
a third tie-down assembly attached to the second pillar structure such that the third tie-down assembly is a third distance above the floor structure, the third distance being greater than the first distance and the second distance.

11. The vehicle structure according to claim 10, wherein the first pillar structure defines a rearward-most pillar of the vehicle body structure.

12. The vehicle structure according to claim 11, wherein the second pillar structure is located forward of the first pillar structure.

13. The vehicle structure according to claim 10, wherein the second pillar structure has a second inner panel and a supplemental reinforcement panel, the third tie-down assembly being fixedly attached to both the second inner panel and the supplemental reinforcement panel.

14. The vehicle structure according to claim 13, wherein the third tie-down assembly includes a first fastener portion, a bracket and a D-ring, the D-ring being supported to the bracket for pivotal movement with respect to the bracket, the first fastener portion extending through an opening in the bracket and through a second fastener portion rigidly fixed to the supplemental reinforcement panel.

15. A vehicle structure, comprising
a vehicle body structure defining a cargo area having a floor structure, a first pillar structure and a second pillar structure that extend upward from the floor structure;
a first tie-down assembly attached to the first pillar structure;
a second tie-down assembly attached to the second pillar structure; and a third tie-down assembly attached to the second pillar structure at a location above the second tie-down assembly.

16. The vehicle structure according to claim 15, wherein the first tie-down assembly is a first distance above the floor structure,
the second tie-down assembly is a second distance above the floor structure, and
the third tie-down assembly is a third distance above the floor structure, the third distance being greater than the first distance and greater than the second distance.

17. The vehicle structure according to claim 15, wherein the first pillar structure has a first inner panel and a first reinforcement panel, the first tie-down assembly including a first fastener portion, a bracket and a D-ring, the D-ring being supported to the bracket for pivotal movement with respect to the bracket, the first fastener portion extending through an opening in the bracket, through another opening in the first inner panel and through a second fastener portion rigidly fixed to the first reinforcement panel.

18. The vehicle structure according to claim 17, wherein the second pillar structure has a second inner panel, a second reinforcement panel and a supplemental reinforcement panel, the second tie-down assembly including a first fastener portion, a bracket and a D-ring, the D-ring being supported to the bracket for pivotal movement with respect to the bracket, the first fastener portion extending through an opening in the bracket, through an opening in the first inner panel and through a second fastener portion rigidly fixed to the second reinforcement panel.

19. The vehicle structure according to claim 18, wherein the third tie-down assembly includes a first fastener portion, a bracket and a D-ring, the D-ring being supported to the bracket for pivotal movement with respect to the bracket, the first fastener portion extending through an opening in the bracket, through the second inner panel and through a second fastener portion rigidly fixed to the supplemental reinforcement panel.

20. The vehicle structure according to claim 10, wherein the first pillar structure has a first inner panel and a first reinforcement panel the first tie-down assembly being fixedly attached to both the first inner panel and the first reinforcement panel.

* * * * *